United States Patent [19]
Haas

[11] Patent Number: 5,990,993
[45] Date of Patent: *Nov. 23, 1999

[54] DISPLAY DEVICE HAVING A BACKLIGHTING SYSTEM SUPPLYING COLLIMATED LIGHT

[75] Inventor: Gunther Haas, Leonberg, Germany

[73] Assignee: Thomson multimedia S.A., Courbevoie, France

[ * ] Notice: This patent issued on a continued prosecution application filed under 37 CFR 1.53(d), and is subject to the twenty year patent term provisions of 35 U.S.C. 154(a)(2).

[21] Appl. No.: 08/690,900

[22] Filed: Aug. 1, 1996

[30] Foreign Application Priority Data

Aug. 11, 1995 [FR] France ................................ 95-09753

[51] Int. Cl.$^6$ ........................ G02F 1/1335; G02F 1/1333
[52] U.S. Cl. .............................. 349/96; 349/158; 349/110
[58] Field of Search ........................... 349/95, 106, 112, 349/110, 96, 158

[56] References Cited

U.S. PATENT DOCUMENTS

| | | | |
|---|---|---|---|
| 3,854,815 | 12/1974 | McIntosh | 355/67 |
| 4,171,874 | 10/1979 | Bigelow et al. | 349/112 |
| 4,239,349 | 12/1980 | Scheffer | 349/112 |
| 4,560,241 | 12/1985 | Stolov et al. | 349/106 |
| 4,776,673 | 10/1988 | Aoki et al. | 349/110 |
| 5,046,793 | 9/1991 | Hockley et al. | 359/12 |
| 5,052,783 | 10/1991 | Hamada | 349/5 |
| 5,132,830 | 7/1992 | Fukatani et al. | 349/112 |
| 5,478,611 | 12/1995 | Hashimoto | 428/1 |
| 5,504,602 | 4/1996 | Farmer | 349/112 |
| 5,528,397 | 6/1996 | Zavracky et al. | 349/42 |
| 5,539,550 | 7/1996 | Spitzer et al. | 349/42 |
| 5,561,538 | 10/1996 | Kato et al. | 349/61 |
| 5,594,561 | 1/1997 | Blanchard | 349/112 |
| 5,615,030 | 3/1997 | Harada et al. | 349/110 |

FOREIGN PATENT DOCUMENTS

| | | | |
|---|---|---|---|
| 0337555 | 10/1989 | European Pat. Off. | G02F 1/133 |
| 0353069 | 1/1990 | European Pat. Off. | G02F 11/01 |
| 0371398A3 | 6/1990 | European Pat. Off. | G02F 1/1335 |
| 0396824 | 11/1990 | European Pat. Off. | G02F 1/1335 |
| 6148627 | 5/1994 | Japan | G02F 1/1335 |
| WO 94/20879 | 9/1994 | WIPO | G02F 1/1335 |

*Primary Examiner*—William L. Sikes
*Assistant Examiner*—Toan Ton
*Attorney, Agent, or Firm*—Joseph S. Tripoli; Peter M. Emanuel; Frederick A. Wein

[57] ABSTRACT

A display device having a backlighting system supplying collimated light, a transmissive electro-optical modulator of the liquid crystal display type and a means for distributing the light angularly. The distance between the means for distributing the light angularly and the display is chosen so as to obtain a spatial filtration effect. A layer of colored filters is positioned between the display and the means for distributing the light angularly.

5 Claims, 5 Drawing Sheets

DISPLAY DEVICE HAVING A BACKLIGHTING SYSTEM SUPPLYING COLLIMATED LIGHT

BACKGROUND

The present invention concerns improvements to a display device, more particularly of the liquid crystal display type, used in transmission mode and back-lit by a lighting system supplying collimated light.

Liquid crystal displays have the drawback that their electro-optical characteristics are heavily dependent on the angle of observation. Thus, in the case of very large viewing angles, a degradation in contrast and an inversion of the grey scale is observed. To remedy these drawbacks, it has been proposed that a collimated light source be used, a means for distributing the light angularly (notably a network of micro-lenses or a holographic diffuser) being associated with the modulator on the observation side. In this case, the light seen by an observer looking at the display at a certain angle is modulated by the liquid crystal display within a solid angle independent of the angle of observation. Furthermore, the use of collimated light allows various improvements to be made with regard to the display device itself and the elements associated with it to produce the complete direct-vision system.

SUMMARY OF THE INVENTION

The object of the present invention is therefore a display device having a backlighting system supplying collimated light, a transmissive electro-optical modulator of the liquid crystal display type and a means for distributing the light angularly, characterised in that the distance between the means for distributing the light angularly and the display is chosen so as to obtain a spatial filtration effect.

A further object of the present invention is a display device having a backlighting system supplying collimated light, a transmissive electro-optical modulator of the liquid crystal display type and a means for distributing the light angularly, characterised in that a layer of coloured filters is positioned between the display and the means for distributing the light angularly. This layer of coloured filters can include a black matrix layer.

According to another characteristic of the present invention, one of the transparent substrates forming the liquid crystal display incorporates a one or two-dimensional row of micro-lenses, each micro-lens forming the image of the associated pixel element of the display on the diffusion screen.

According to another characteristic, one of the transparent substrates forming the liquid crystal display incorporates a one or two-dimensional row of micro-lenses, each micro-lens collecting the light entering the associated pixel element of the display.

BRIEF DESCRIPTION OF THE DRAWINGS

Other characteristics and advantages of the present invention will emerge from a reading of the description given below of various embodiments of the present invention, this description being written with reference to the accompanying drawings, in which.

To simplify the description, in the figures the same elements have the same references.

DESCRIPTION OF THE PREFERRED EMBODIMENTS

Figure 2:
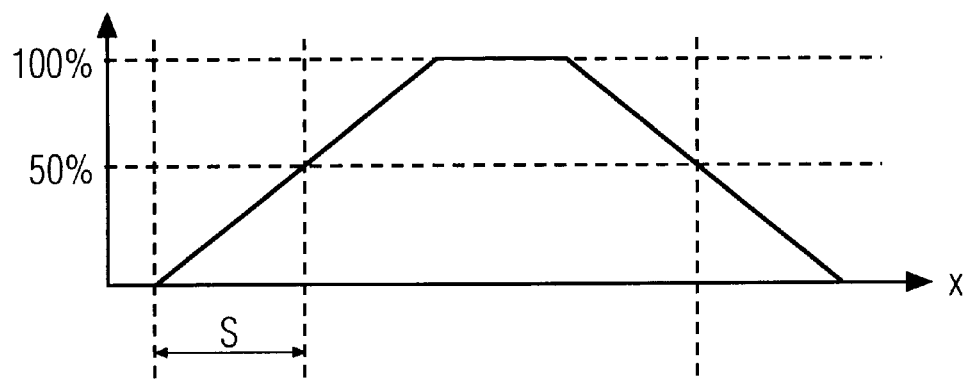
FIG. 2 depicts a curve indicating the intensity of the light distribution on the screen for a given collimation angle.
Figure 1:
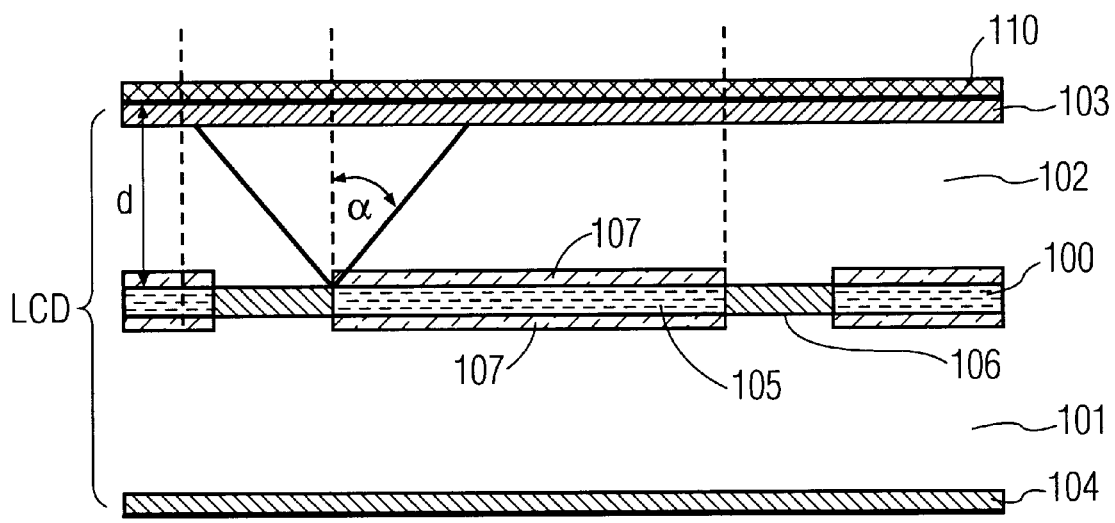
FIG. 1 is a schematic view in cross-section of a display device using a backlighting system giving collimated light.
Figure 1:
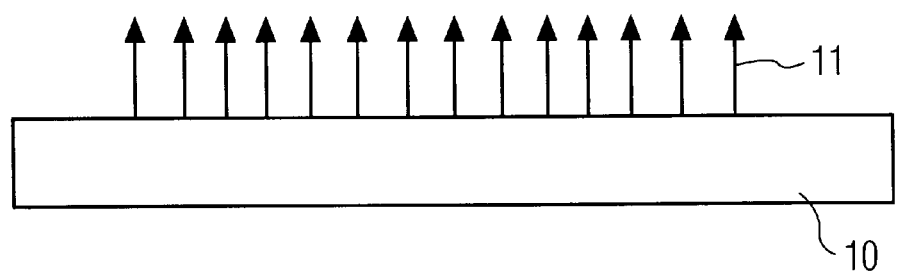

Different improvements to a display device having a backlighting system enabling collimated light to be obtained will now be described with reference to FIGS. 1 to 8. Thus, as depicted in FIG. 1, the backlighting system referenced 10 enables heavily collimated light to be obtained, whose rays are referenced 11. A system capable of being used in the display devices will be described hereinafter. As depicted in FIG. 4, this system consists essentially of a liquid crystal display, referenced LCD in FIG. 4, which in a known manner consists of a layer of liquid crystal 100 of a thickness of several micrometers enclosed between two transparent substrates 101 and 102 with polarisers 103 and 104 fixed to the walls. Each element forming an image, known as a pixel, consists of an active surface 105 surrounded by an inactive surface which in a typical manner is covered with a black matrix 106. This black matrix makes it possible to prevent any leakages of light into the black state of the pixel. In general the liquid crystal is addressed by transparent pixel electrodes 107 in the active surface. In a preferred embodiment, a means for distributing the light angularly 110 is fixed to the polariser 103 and the whole is illuminated by the lighting system 10 giving a collimated light. In this case and as depicted in FIG. 2, if the lighting source 10 has a light distribution uniform within a cone characterised by a half aperture angle $\alpha$ where $\alpha$ is measured inside the transparent substrate 101, 102, in this case the image of the active surface 105 formed on the diffusion screen 110 has an intensity distribution as depicted in FIG. 2. In this case, the dispersion of a pixel can be characterised by the distance S defined in FIG. 2 and which gives on the diffuser 110 the distance from the original pixel where the intensity reaches 0.

Figure 3:
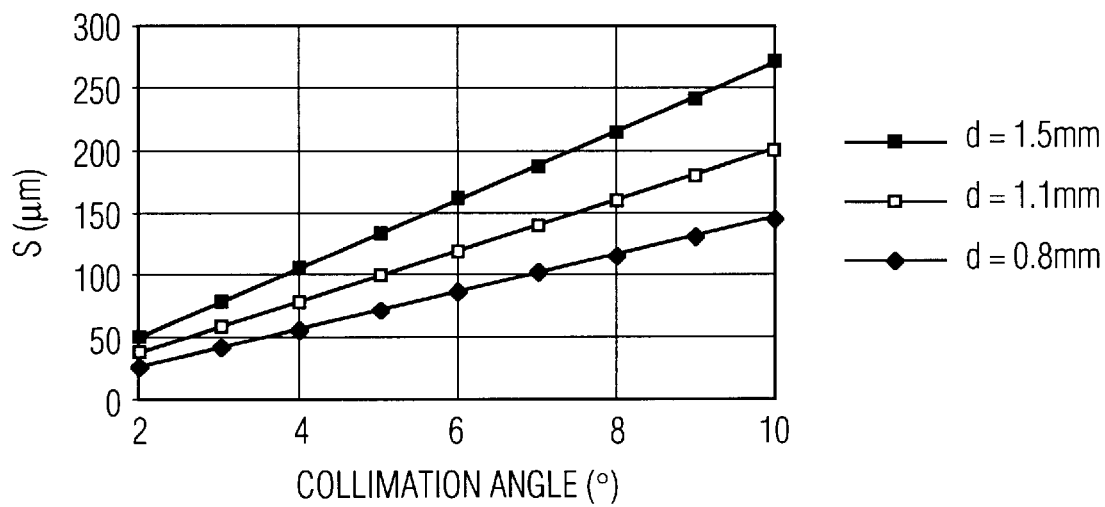
FIG. 3 is a curve giving the distance s as a function of the diffusion of a pixel as a function of the collimation angle $\alpha$.
Figure 4:
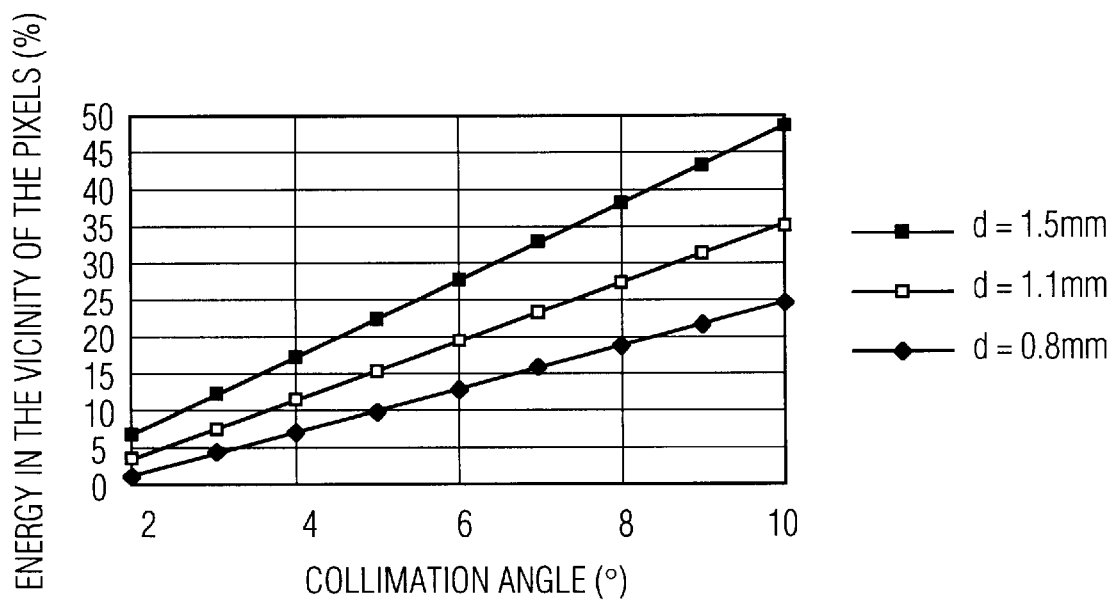
FIG. 4 depicts the percentage of energy entering the adjacent pixels as a function of the collimation angle $\alpha$ for different liquid crystal screen thicknesses.

To better illustrate one of the advantages of the present invention, FIGS. 3 and 4 depict the distance S as defined above as a function of the collimation angle $\alpha$ for different thicknesses D corresponding to the thickness of the transparent substrate 102 plus the thickness of the polariser 103, and the energy in the vicinity of a pixel as a function of the collimation angle $\alpha$ for these different thicknesses 2. The value D=1.5 mm corresponds to the thickness of glass most widely used with a normal polariser 0.4 mm in thickness. However, it is possible to produce liquid crystal screens with glass thicknesses of 0.7 mm, in this case D=1.1 mm corresponds to a glass thickness of 0.7 mm and a polariser 0.4 mm in thickness, while D=0.8 mm corresponds to a glass of 0.7 mm with a specific polariser. It will be noted in this case that even if D=1.5 mm a collimation angle of 4° is completely acceptable. Such a collimation angle can easily be obtained with a halogen lamp, a tungsten lamp or a fluorescent tube in a backlighting device as described above. Thus, according to one characteristic of the present invention and for certain applications, this diffusion effect can be used to obtain spatial filtration of the display. In order to omit the pixel structure of the display, the distance D and the collimation angle a can be adjusted in a suitable manner without affecting the resolution of the display.

The backlighting system used to obtain collimated light can be any system known in the literature. This can also be a system such as that described in the French patent application filed on the same day entitled "Backlighting system for a transmissive electro-optical modulator and display device having such a lighting system".

Figure 5:
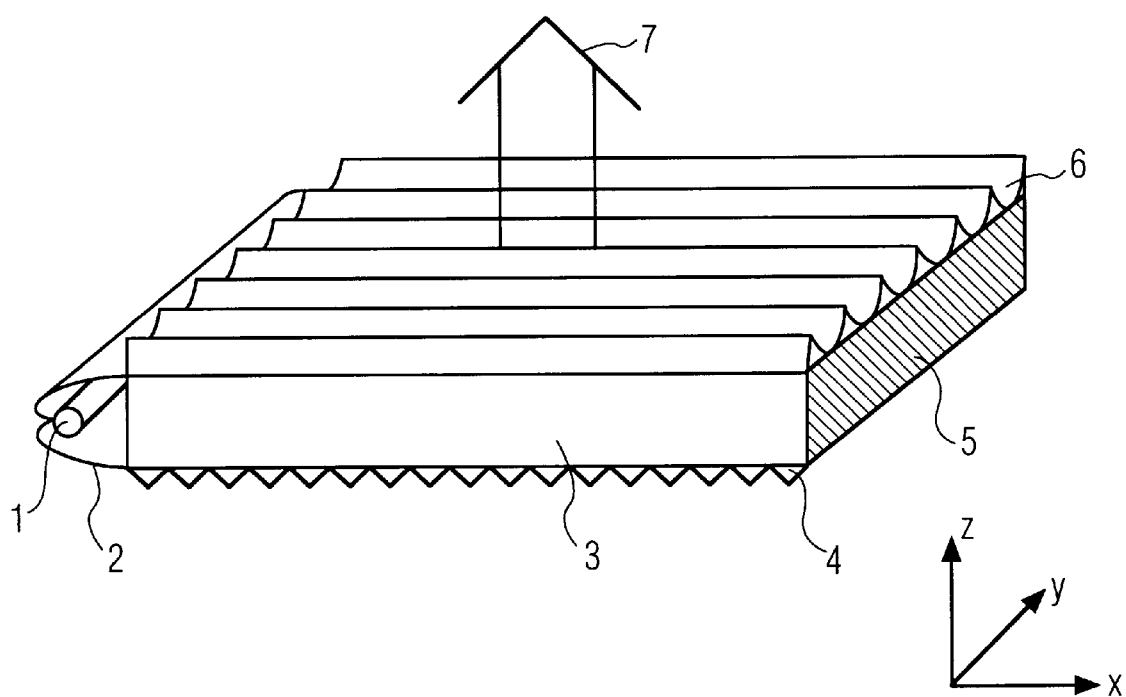
FIG. 5 is a schematic perspective view of a backlighting system giving collimated light capable of being used in the present invention.

As depicted in FIG. 5, this lighting system enabling collimated light to be obtained has a light source 1 which can, for example, be produced by means of a fluorescent tube. This light source is surrounded along the entire length of the tube 1 by a reflection means 2 for sending back the light rays emitted by the tube in a first direction referred to as x. The reflector 2 preferably has the form of an optical concentrator known for example by the term CPC (compound parabolic concentrator). This reflector 2 is extended by a light transmission means 3 positioned at the exit from the reflector so as to transport the light rays in the direction x. This light transmission means 3 is preferably a waveguide made from a transparent material which can be, for example, glass or a polymeric organic material such as an acrylic material. The height of the waveguide 3 is preferably greater than or equal to the circumference of the light source 1 so as to obtain maximum effectiveness in the transmission of the light. In a known manner, the waveguide 3 has on its lower part a micro-prismatic structure 4 which reflects the light rays specularly so as to send them in the direction z. This micro-prismatic structure 4 is either a part of the waveguide 3 or produced from an identical or similar material and index-matched to the waveguide. The light rays are reflected by the micro-prismatic structure either by total internal reflection or by reflection off a metallic coating, preferably aluminium, deposited on the external surface of the micro-prismatic structure. To prevent the light from emerging from the waveguide in the direction x at the opposite end to that receiving the light, this end of the waveguide is covered with a reflective material 5, preferably aluminium. Consequently, the light rays being transported inside the waveguide are reflected specularly by the micro-prismatic structure 4 and sent back in the direction z. It is also possible, according to another embodiment of the present invention, to place a second light source with its reflector at the said end of the waveguide instead of the coating 5 in order to increase the flow of light in the system.

In accordance with the present invention, on the part of the waveguide 3 opposite to that having the micro-prismatic structure, a collimation means 6 is provided for effecting the collimation of the emitted light rays at least in a plane y–z, as depicted in FIG. 5. Consequently the light referenced 7 extracted from the waveguide by specular reflection is collimated in the plane z–y by this special collimation means 6, this light already being collimated in the plane x–z.

Figure 6:
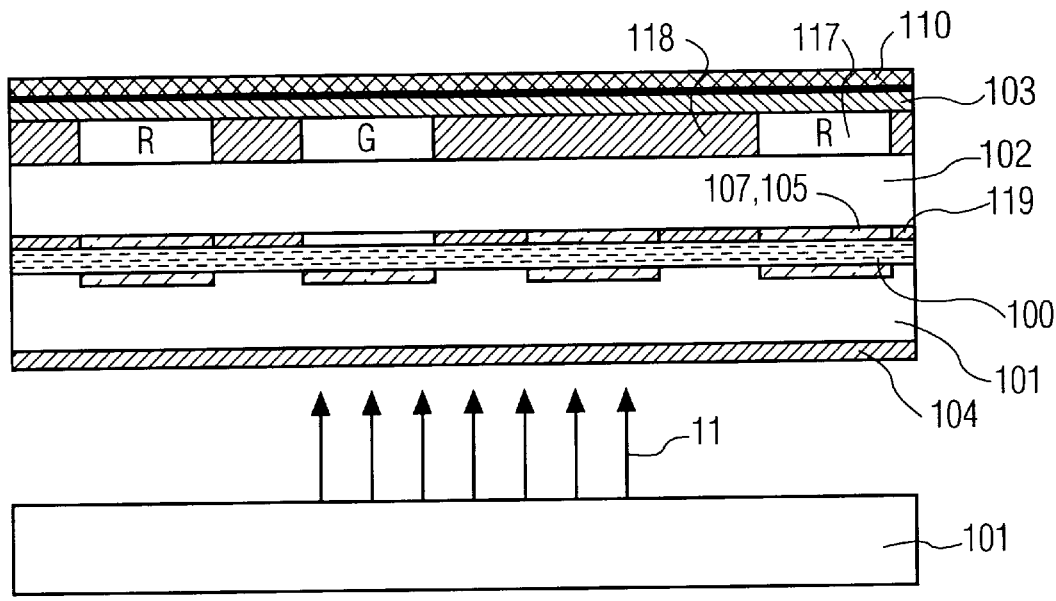
FIG. 6 depicts the arrangement of the coloured filter in a liquid crystal display used in the present invention.
Figure 7A:
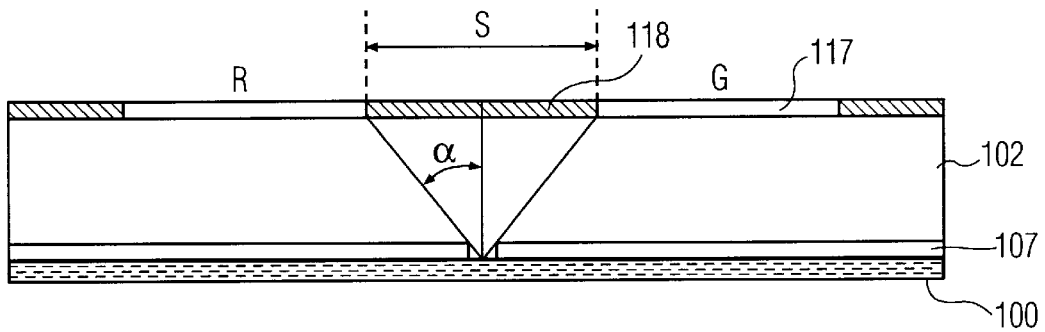
FIGS. 7a, 7b and 7c depict different drawings for the black matrix in accordance with the present invention.
Figure 7B:
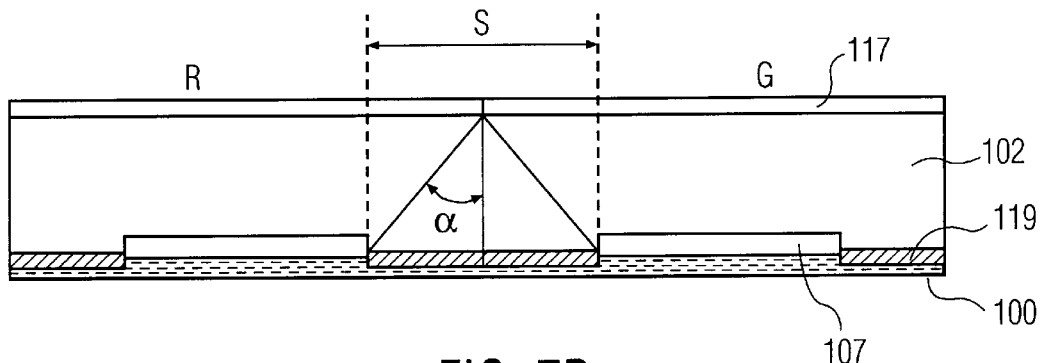
Figure 7C:
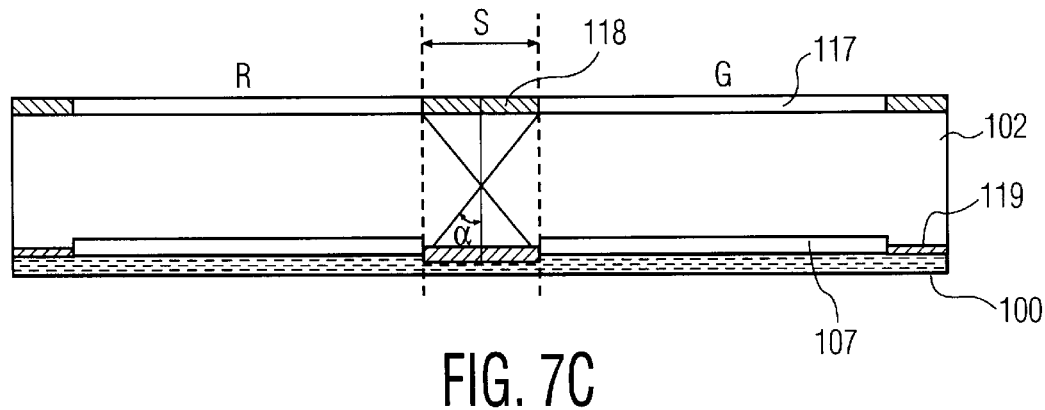

Another embodiment of a display device using a lighting system giving a collimated light enabling a particular structure for coloured filters to be used will now be described with reference to FIG. 6. Thus, as depicted in FIG. 6, in which the elements identical to those in FIG. 1 are depicted with the same references, the coloured filters, which in a conventional liquid crystal screen are placed inside one of the transparent substrates, have been positioned outside as depicted by the reference 117 in FIG. 6. The use of coloured filters 117 outside the substrate 102 makes it possible to use inexpensive coloured filters, for example simple photographic films which have been exposed to the desired pixel structure. In the preferred embodiment depicted in FIG. 6, a layer of coloured filters 117 incorporating a black matrix 118 is placed outside the transparent substrate 102 followed by the polariser 103 and the diffusion screen 110. Depending on the application and the material used to produce the coloured filters, the coloured filter can also be placed in front of the polariser 103. Generally an additional black matrix 119 will be used on the transparent substrate to prevent any leakage of light into the black state. To prevent the phenomena known by the term "cross colour" there must be at least one black matrix, its width being determined by the fact that the light from a coloured pixel must not enter inside the adjacent pixel on the diffusion screen. Three arrangements are possible as depicted in FIGS. 7a to 7c in which P represents the pitch of an individual coloured pixel. Thus, as depicted in FIG. 7a, the black matrix is produced only on the layer of coloured filters 117. The black matrix has a width of 2S and the transmission in this case is given by the formula T=(P−2S)/p. FIG. 7b depicts a black matrix 119 produced inside the transparent substrate. In FIG. 7c, a black matrix 117 is produced on the layer of coloured filters 118 and a black matrix 119 is produced outside the transparent substrate. In this case the width of the black matrix is S and the transmission T=(P−3/2S)/p. The solution depicted in FIG. 7c is the preferred solution in the majority of cases because it gives the highest transmission. Thus the table below showing the distance S and the transmission of the black matrices 118 and 119, assuming a pixel pitch of 100 $\mu$m×300 $\mu$m and for two different thicknesses of the transparent substrates, has been depicted.

| | s [$\mu$m] | | Transmission [%] | |
|---|---|---|---|---|
| $\alpha$ [°] | d = 1.1 mm | d = 0.7 mm | d = 1.1 mm | d = 0.7 mm |
| 1 | 19 | 12 | 71 | 82 |
| 2 | 38 | 24 | 42 | 63 |
| 3 | 58 | 37 | 14 | 45 |
| 4 | 77 | 49 | 0 | 27 |

The layer of coloured filters having a black matrix as depicted in FIG. 6, for example, can be obtained in numerous ways. Thus it is possible to use a photographic process in which a photographic film is exposed with the desired colour filter structure and subsequent development. It is also possible to use a printing process. The layer of coloured filters can also be obtained using a dichroic interference filter or a holographic process or a birefringent interference using a liquid crystal polymer.

Other improvements can also be used with the display device in accordance with the present invention. Thus the diffusion screen can be a diffusion screen having non-lambertian characteristics directing the light in a predetermined angular range, which increases luminance in this range in comparison with a lambertian diffuser.

It is also possible, in order to optimise the contrast of the system, to choose the angular distribution of the collimated light supplied by the backlighting system so that it is in agreement with the contrast characteristic of the liquid crystal screen. Furthermore, the light output of the system can be improved if a row of micro-lenses is incorporated in the transparent substrate 102, each forming the image of the associated pixel on the screen 110. In this case, the black matrix 118 is redundant. In the same way, rows of micro-lenses can be incorporated in or on the transparent substrate 101 in order to collect all the incident light on the active surface 105 of the associated pixel. The said rows of micro-lenses can be one-dimensional rows of cylindrical lenses, the number of lenses corresponding to the number of pixels in the horizontal and vertical directions. It is also possible to use two-dimensional rows of the same dimension as the matrix formed by the pixels of the liquid crystal screen.

Figure 8:
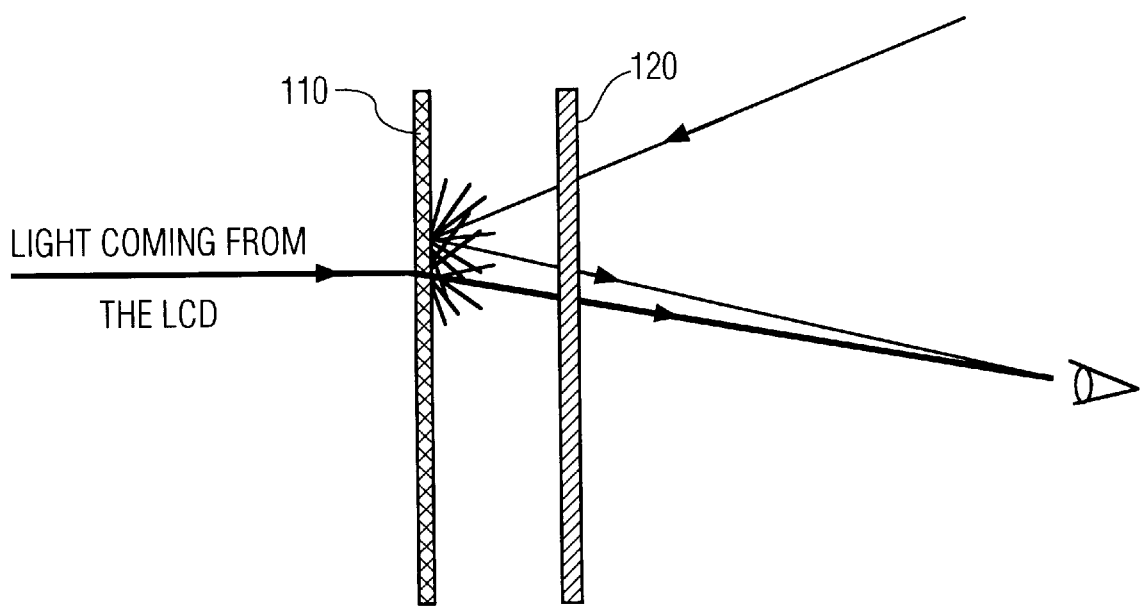
FIG. 8 depicts schematically an improvement enhancing the contrast.

One important improvement concerns the contrast of the display device according to the invention under ambient light: depending on the choice of the distribution means 110, which can be produced in an effective manner with a ground glass or a holographic diffuser, the contrast under ambient light is often limited by the backscatter from the element 110. Profiting from the fact that the light emanating from the LCD is polarised and that this polarisation is generally maintained by the element 110 (for example in the case of a ground glass or a holographic diffuser), whilst the polarisation of the ambient light backscattered by the same element 110 is generally destroyed, the ambient-light contrast can be increased considerably (up to a factor of 4) by placing a polariser 120 after the diffusion means 110 as shown in FIG. 8. Its orientation is parallel in relation to the exit polariser of the LCD. In certain cases where the polarisation of the light emanating from the LCD is extremely well maintained in passing through the element 110, the polariser 120 can assume the function of the polariser at the exit of the LCD, which makes it possible to remove the latter in order to improve the luminance of the display system.

Numerous improvements can be made to the above system without departing from the scope of the attached claims.

I claim:

1. A display device comprising:
   a backlighting system supplying collimated light,
   a transmissive electro-optical modulator of the liquid crystal display comprising:
   a first and a second transparent substrates enclosing a liquid crystal layer addressed by a pixel electrode,
   a first and a second polarizers fixed on each side of said electro-optical modulator; and,
   a means for distributing the light angularly,
   a distance D corresponding to the second transparent substrate and second polarizer thickness and a collimation angle $\alpha$ measured inside the transparent substrate due to collimated light are, and
   D is between 0.8 $\mu$m and 1.5 $\mu$m and $\alpha$ is about 4°.

2. Display device according to claim 1, wherein a specific layer comprising colored filter members and black matrix members is positioned externally to the transmissive electro-optical modulator.

3. Display device according to claim 2, wherein the black matrix members have a width of 2S, and wherein S corresponds to the distance from the pixel electrode where the intensity reaches "0" on the means for distributing the light angularly.

4. Display device according to claim 1 further comprising a second black matrix positioned inside the electro-optical modulator.

5. Display device according to claim 2, wherein the black matrix members of the specific layer have a width of S, and wherein S corresponds to the distance from the pixel electrode where the intensity reaches "0" on the means for distributing the light angularly.

* * * * *